US012212086B2

(12) United States Patent
Gao et al.

(10) Patent No.: US 12,212,086 B2
(45) Date of Patent: Jan. 28, 2025

(54) ELECTRICAL CONNECTOR

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Sheng-Pin Gao, Kunshan (CN); Chih-Ching Hsu, New Taipei (TW); Hung-Chi Yu, New Taipei (TW); Yong-Chun Xu, Kunshan (CN); Jie Zhang, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 343 days.

(21) Appl. No.: 17/743,606

(22) Filed: May 13, 2022

(65) Prior Publication Data

US 2022/0368048 A1 Nov. 17, 2022

(30) Foreign Application Priority Data

May 14, 2021 (CN) ........................ 202110529203.X

(51) Int. Cl.

| | |
|---|---|
| ***H01R 13/66*** | (2006.01) |
| ***H01R 12/72*** | (2011.01) |
| ***H01R 13/514*** | (2006.01) |
| ***H01R 13/62*** | (2006.01) |
| *H01R 107/00* | (2006.01) |

(52) U.S. Cl.

CPC ......... *H01R 12/724* (2013.01); *H01R 13/514* (2013.01); *H01R 13/6205* (2013.01); *H01R 2107/00* (2013.01)

(58) Field of Classification Search

CPC ................ H01R 12/724; H01R 13/514; H01R 13/6205; H01R 2107/00; H01R 13/719; H01R 13/6585; H01R 13/6594; H01R 2201/04; H01R 13/506; H01R 12/585; H01R 12/523; H01R 13/6658;

(Continued)

(56) References Cited

U.S. PATENT DOCUMENTS

| | | | |
|---|---|---|---|
| 6,739,915 B1 | 5/2004 | Hyland et al. | |
| 7,670,183 B2 * | 3/2010 | Huang ............... | H01R 13/6633 439/620.05 |

(Continued)

*Primary Examiner* — Abdullah A Riyami
*Assistant Examiner* — Nelson R. Burgos-Guntin
(74) *Attorney, Agent, or Firm* — Ming Chieh Chang

(57) ABSTRACT

An electrical connector for mounting on an external circuit board includes: an insulating body; a terminal module assembled on the insulating body and including a plurality of mating terminals, an insulating carrier with an accommodating cavity, plural intermediate terminals fixed on one side of the insulating carrier and electrically connected to the mating terminals, plural pin terminals fixed on the other side of the insulating carrier, and a magnetic module accommodated in the accommodating cavity and electrically connected to the intermediate terminals and the pin terminals, wherein the insulating carrier is a two-piece housing, the intermediate terminals are held in one housing piece, and the pin terminals are held in the other housing piece.

9 Claims, 14 Drawing Sheets

(58) Field of Classification Search
CPC ...... H01R 24/64; H01R 13/40; H01R 12/716; H01R 13/02; H01R 13/502
See application file for complete search history.

(56) References Cited

U.S. PATENT DOCUMENTS

| | | | | |
|---|---|---|---|---|
| 9,178,318 | B2 | 11/2015 | Rascon et al. | |
| 9,246,276 | B2 | 1/2016 | Gao | |
| 2003/0100225 | A1* | 5/2003 | Aeschbacher | H01R 13/6633 439/620.06 |
| 2011/0053418 | A1 | 3/2011 | Margulis et al. | |
| 2012/0142199 | A1* | 6/2012 | Purkis | H01R 13/719 439/55 |
| 2012/0315794 | A1* | 12/2012 | Chen | H01R 13/6658 439/620.07 |
| 2014/0024265 | A1* | 1/2014 | Kang | H01R 24/00 439/676 |
| 2014/0045380 | A1* | 2/2014 | Chen | H01F 17/062 439/620.15 |
| 2014/0170904 | A1* | 6/2014 | Tang | H01R 13/6633 439/620.23 |
| 2015/0171564 | A1* | 6/2015 | Hsu | H01R 24/64 439/620.22 |
| 2015/0214667 | A1* | 7/2015 | Chen | H01R 13/6474 439/676 |
| 2016/0020567 | A1* | 1/2016 | Belopolsky | H01R 24/64 439/620.22 |
| 2018/0248320 | A1* | 8/2018 | Xu | H01R 13/6633 |

* cited by examiner

ELECTRICAL CONNECTOR

BACKGROUND OF THE INVENTION

1. Field of the Invention

The present invention relates generally to an electrical connector, and more particularly to an electrical connector with a two-piece housing.

2. Description of Related Arts

With the improvement of the signal transmission rate of RJ45 connectors, the use of eye-of-the-needle structure pin terminals to press-fit and connect to customer motherboards has become the mainstream. Compared with the terminal of the common through-hole mounting structure, the eye-of-the-needle structure pin terminal has strong structure retention, no welding, lower cost, good signal transmission performance, and meets the high-precision design requirements of current products. However, the common one-piece insulating carrier can only be implanted into the terminals of the through-hole mounting structure. There are different processes in the industry on how to assemble and combine the eye-of-the-needle structure pin terminals and insulating carrier. For example, adding another circuit board at the bottom of the terminal module to directly crimp the pin terminals of the eye-of-the-needle structure, and then connecting the two circuit boards through the upper and lower intermediate terminals arranged on the insulating carrier clamped therein is one way. However, this process is complicated and needs higher cost.

Therefore, an improved electrical connector is desired.

SUMMARY OF THE INVENTION

A main object of the present invention is to provide an electrical connector, which is more stable in quality, lower in cost, and lower in equipment investment.

To achieve the above-mentioned object, an electrical connector for mounting on an external circuit board comprises: an insulating body; a terminal module assembled on the insulating body and including a plurality of mating terminals, an insulating carrier with an accommodating cavity, a plurality of intermediate terminals fixed on one side of the insulating carrier and electrically connected to the mating terminals, a plurality of pin terminals fixed on the other side of the insulating carrier, and a magnetic module accommodated in the accommodating cavity and electrically connected to the intermediate terminals and the pin terminals, wherein the insulating carrier is a two-piece housing, the intermediate terminals are held in one housing piece, and the pin terminals are held in the other housing piece.

Compared to prior art, in the electrical connector of the present invention, the insulating carrier is formed by assembling the two-piece housing, thereby realizing the stable combination of the insulating carrier and the pin terminal of the eye-of-the-needle structure and has stable quality, lower cost, and lower equipment investment with conventional molds and dies.

DETAILED DESCRIPTION OF THE PREFERRED EMBODIMENT

Figure 1:
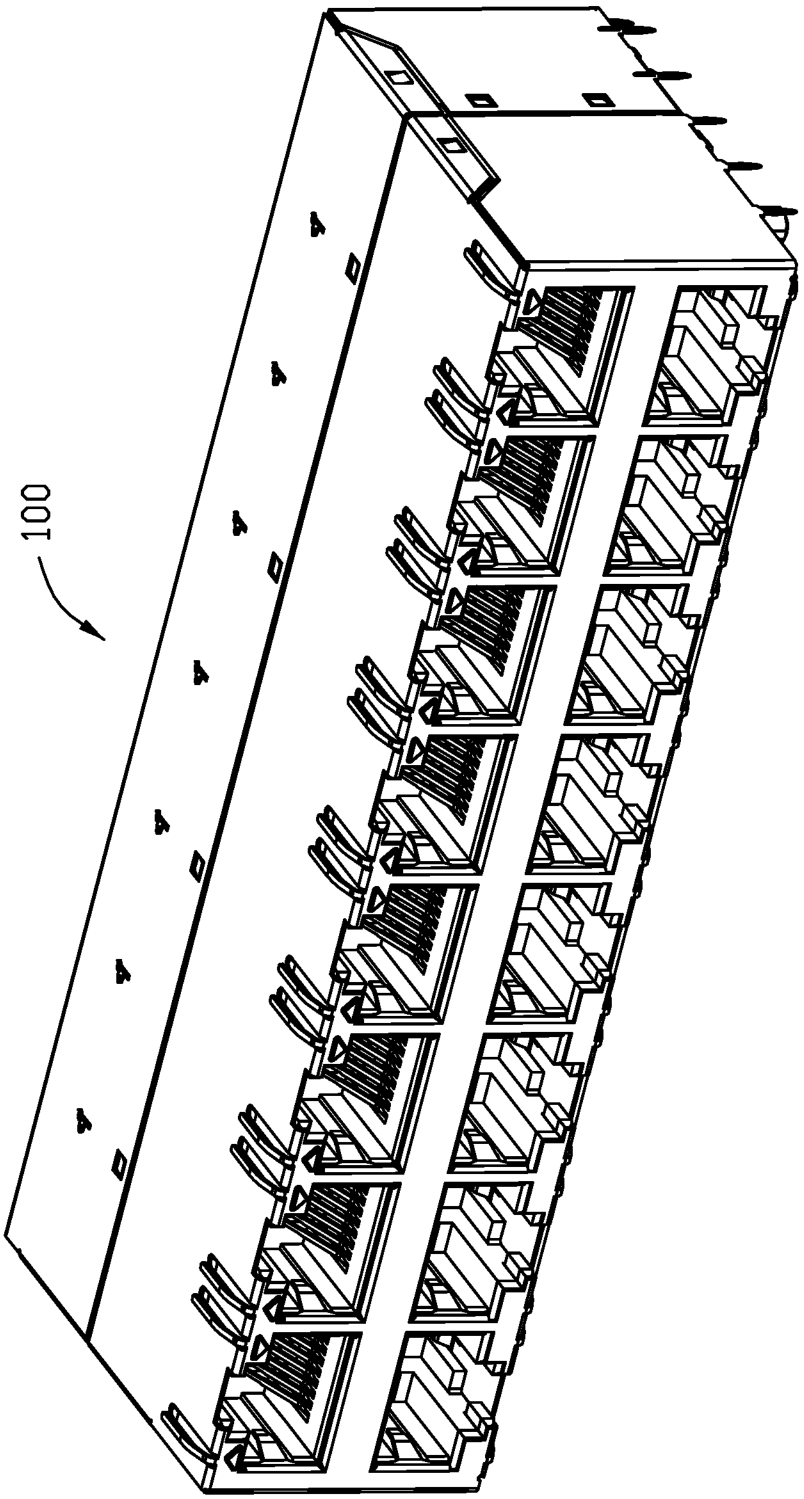
FIG. 1 is a perspective view of an electrical connector in accordance with the present invention.
Figure 2:
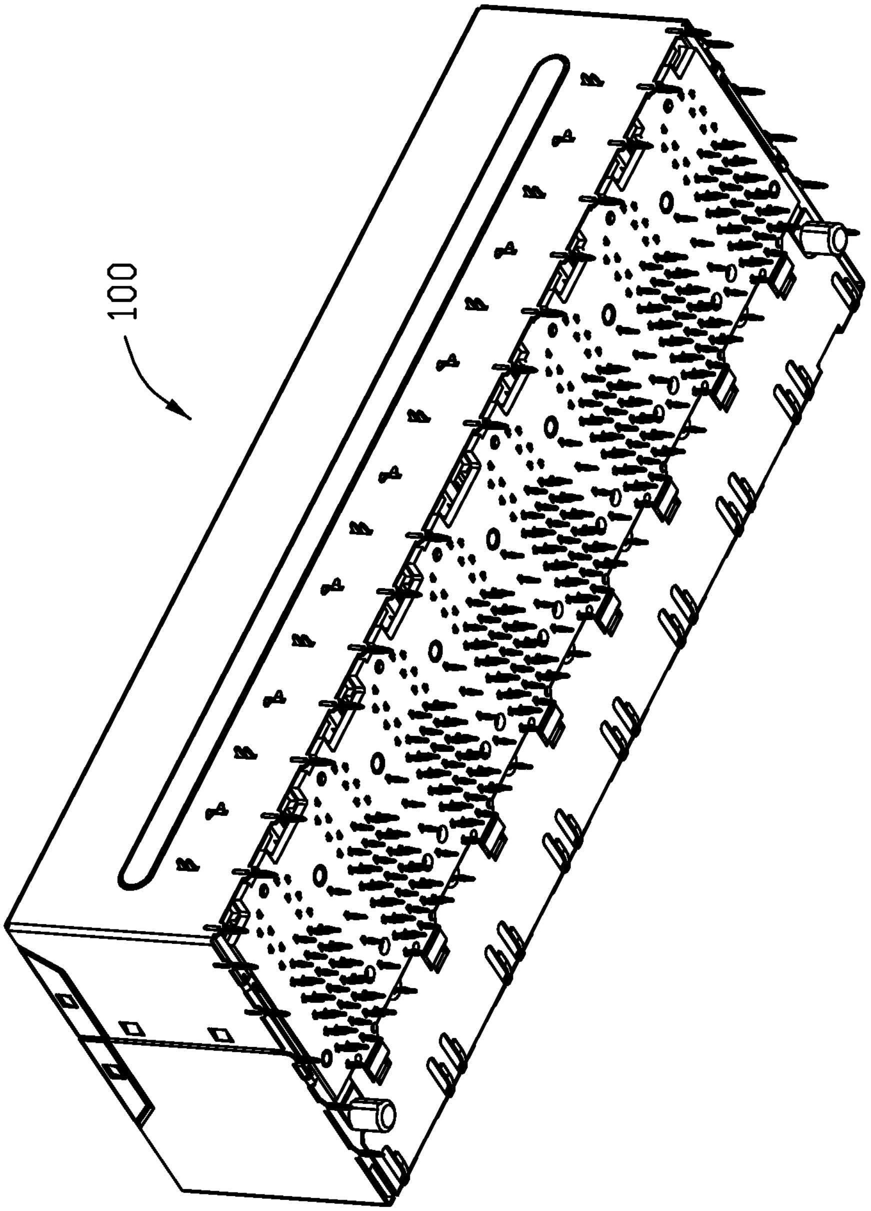
FIG. 2 is another perspective view of the electrical connector in FIG. 1.
Figure 3:
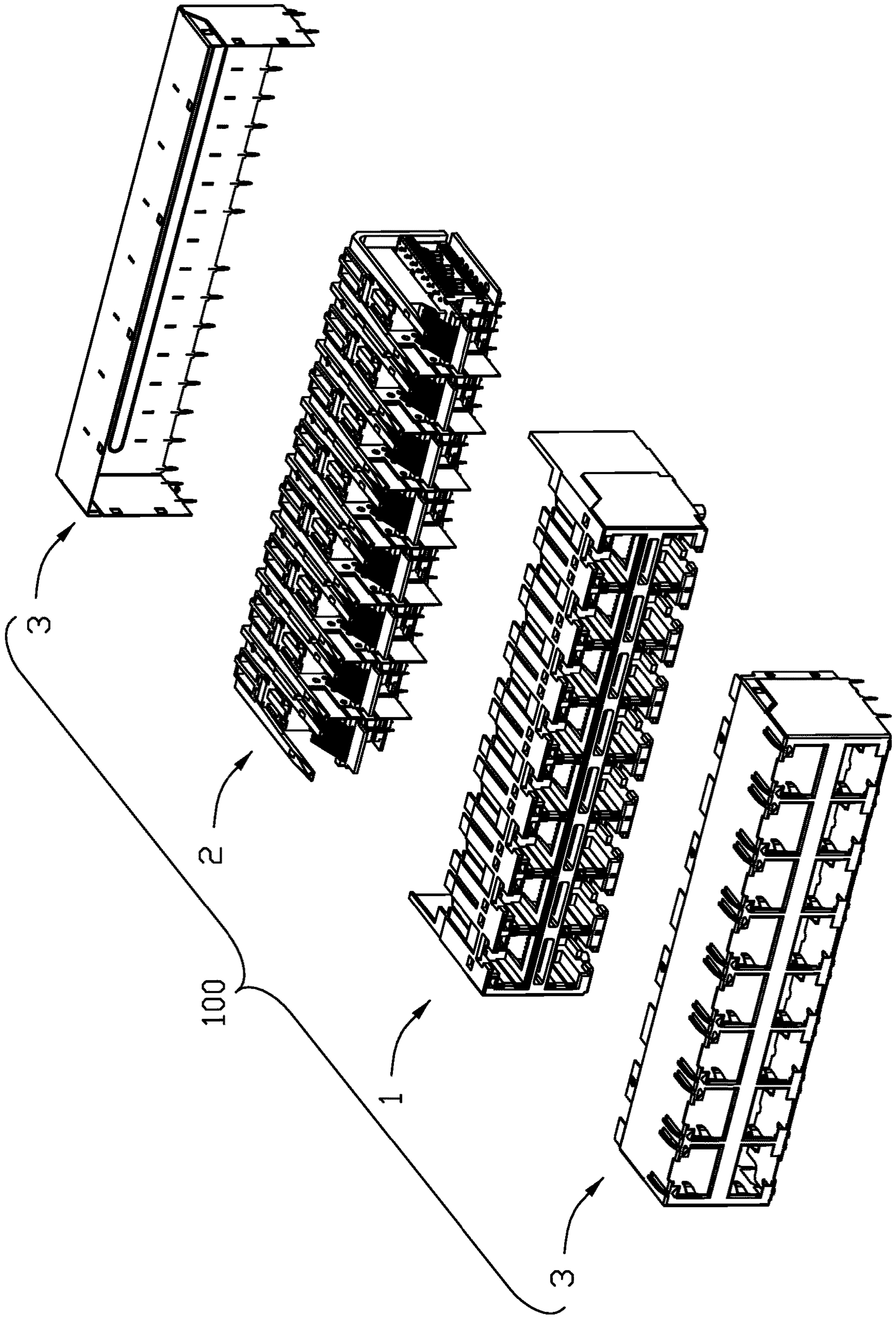
FIG. 3 is a further exploded view of the electrical connector in FIG. 1.
Figure 4:
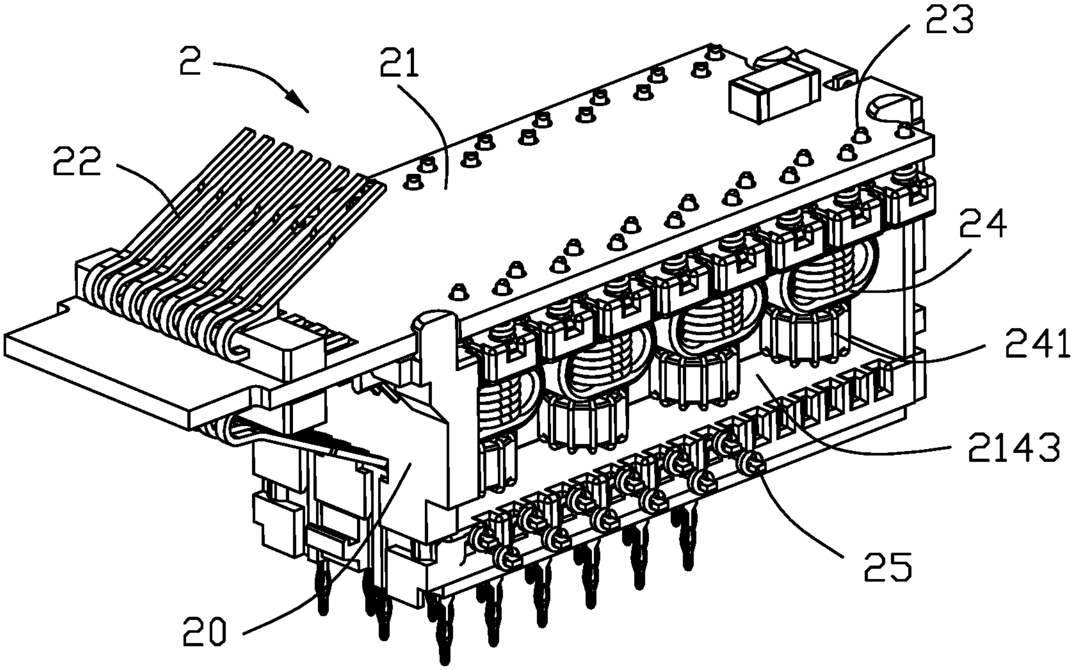
FIG. 4 is a perspective view of a terminal module of the electrical connector in FIG. 1.
Figure 5:
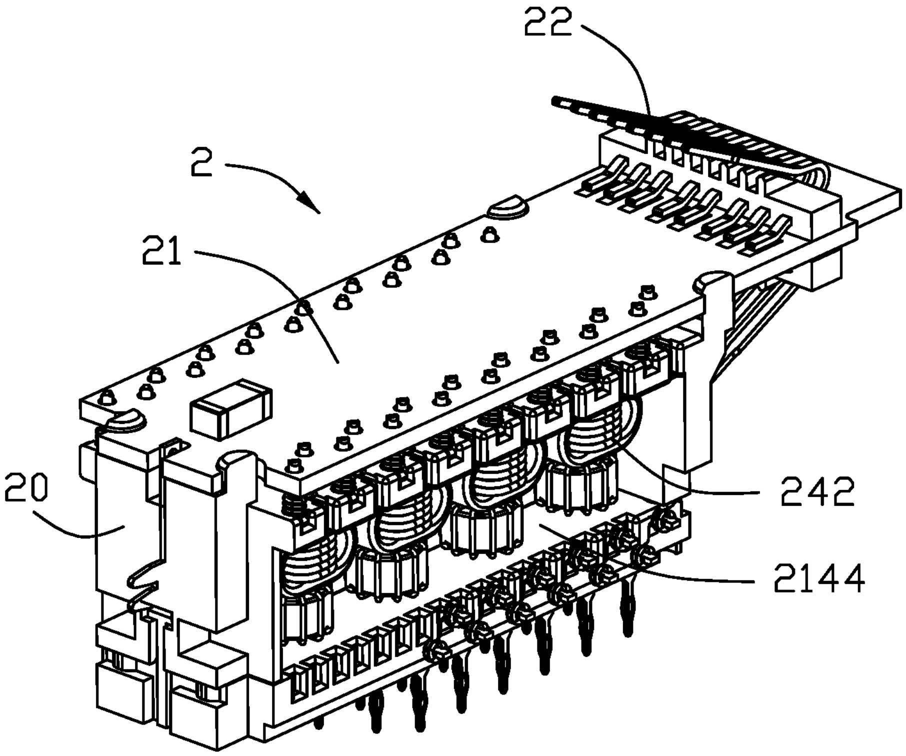
FIG. 5 is another perspective view of a terminal module of the electrical connector in FIG. 4.
Figure 6:
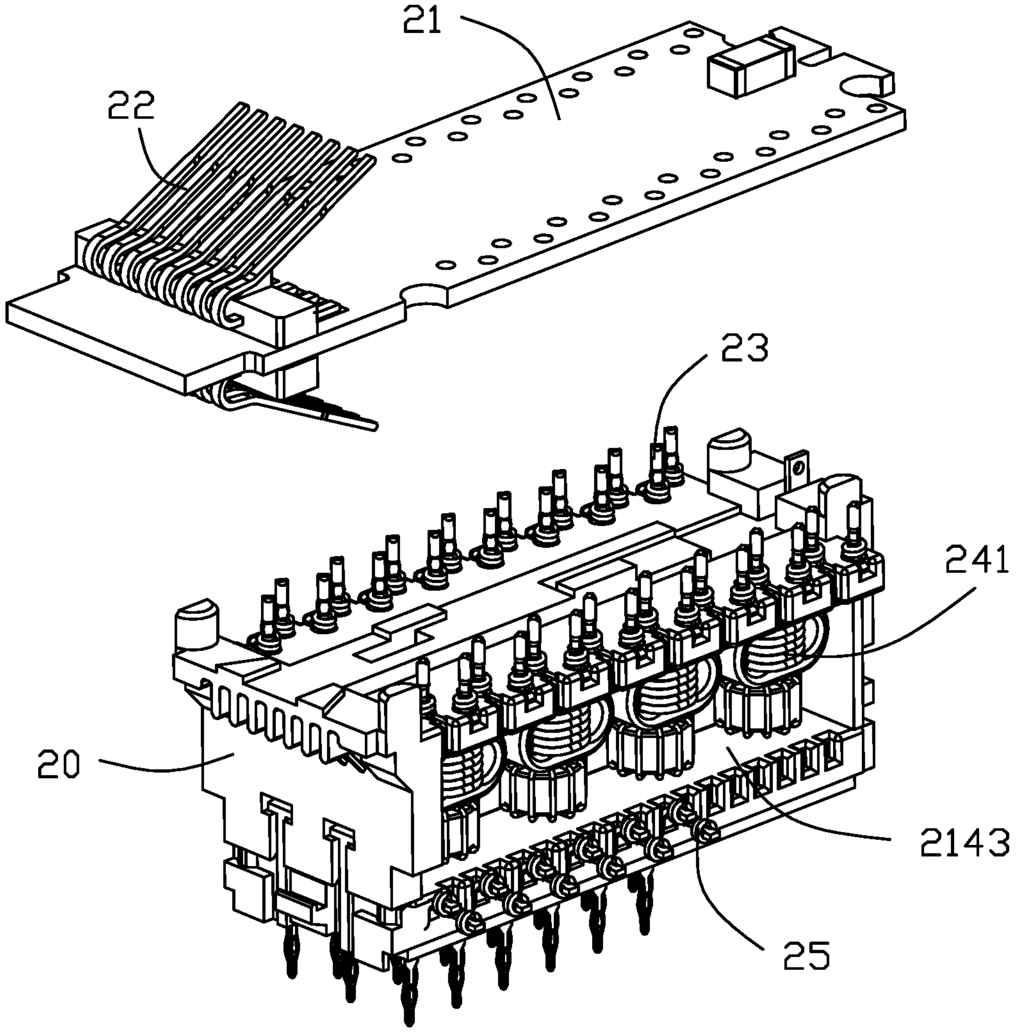
FIG. 6 is a further exploded view of a terminal module of the electrical connector in FIG. 4.
Figure 7:
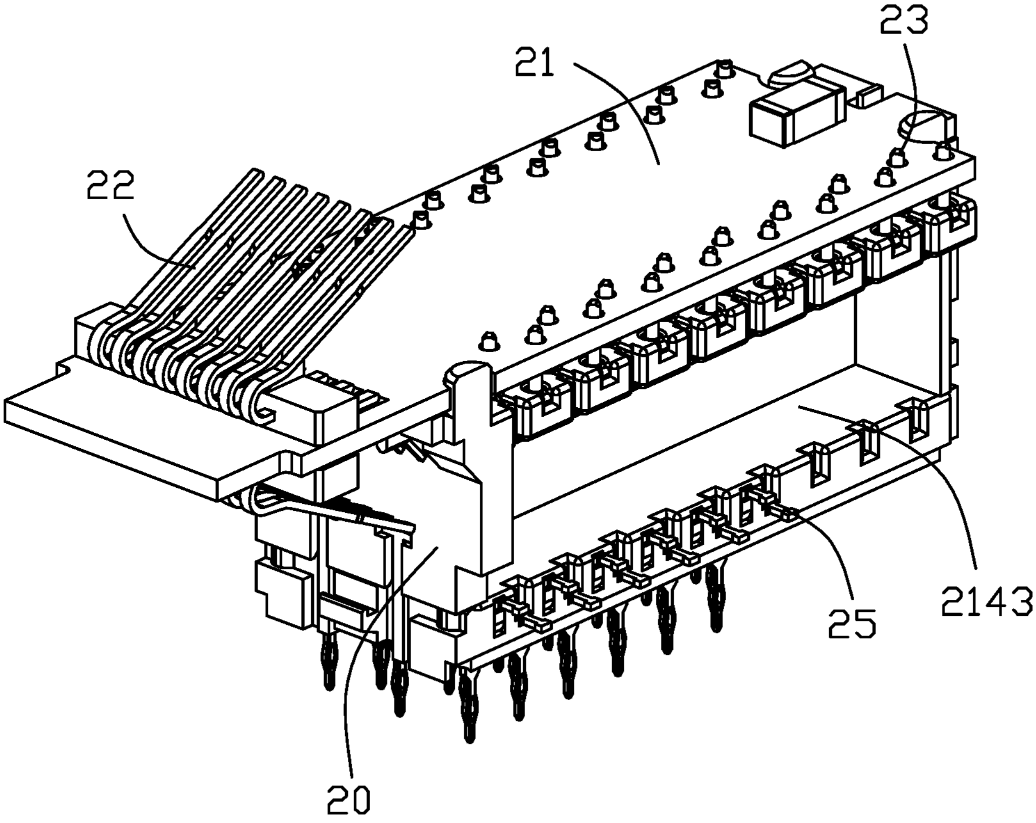
FIG. 7 is a perspective view of the terminal module of the electrical connector in FIG. 4 without a magnetic module.
Figure 8:
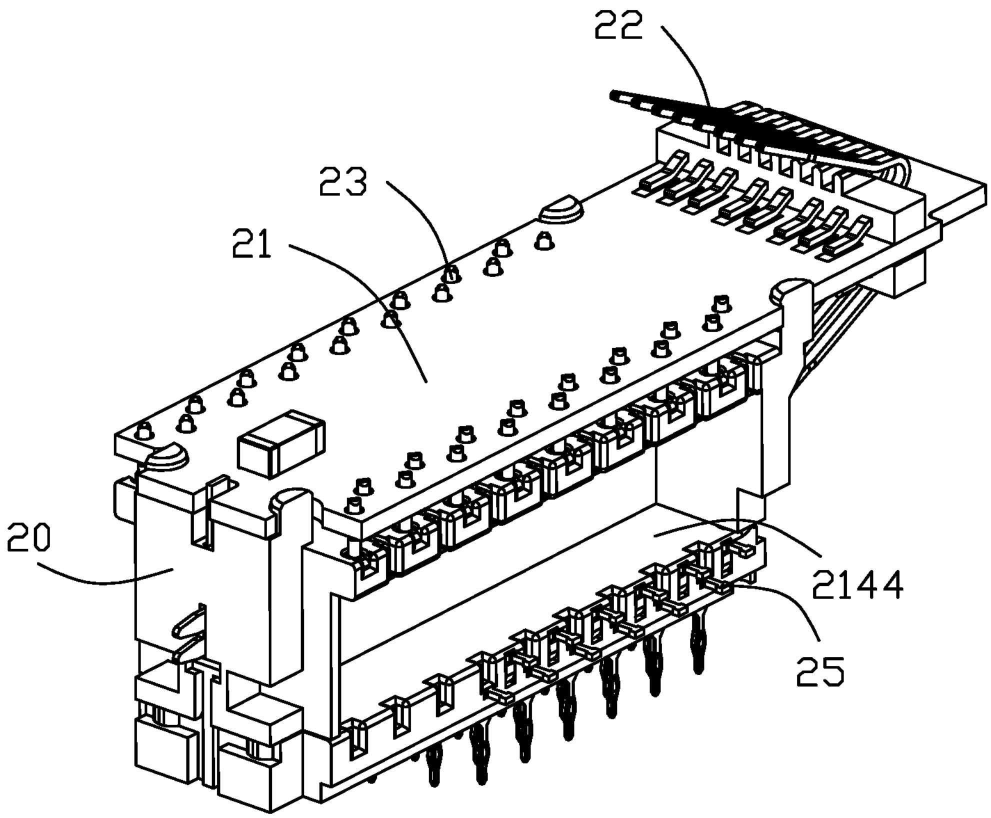
FIG. 8 is another perspective view of the terminal module of the electrical connector in FIG. 7.
Figure 9:
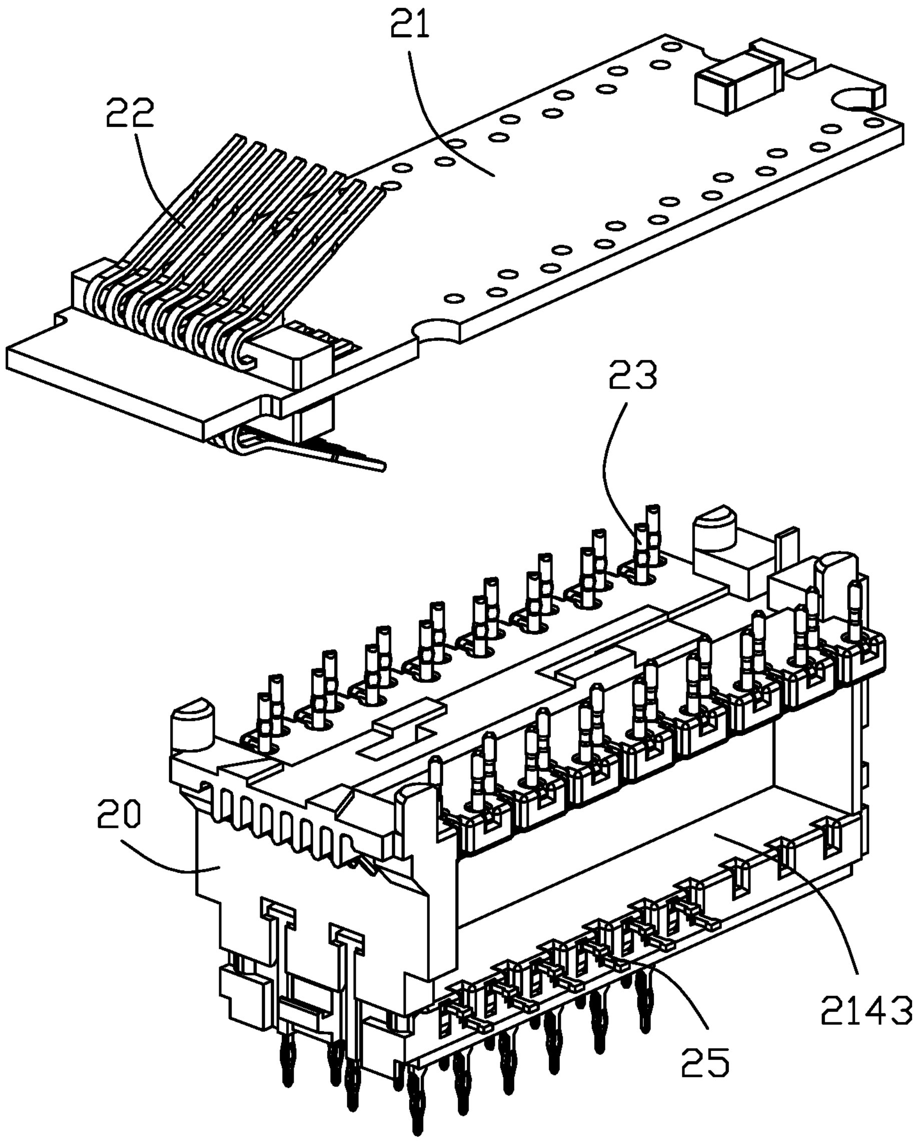
FIG. 9 is a further exploded view of the terminal module of the electrical connector in FIG. 7.
Figure 10:
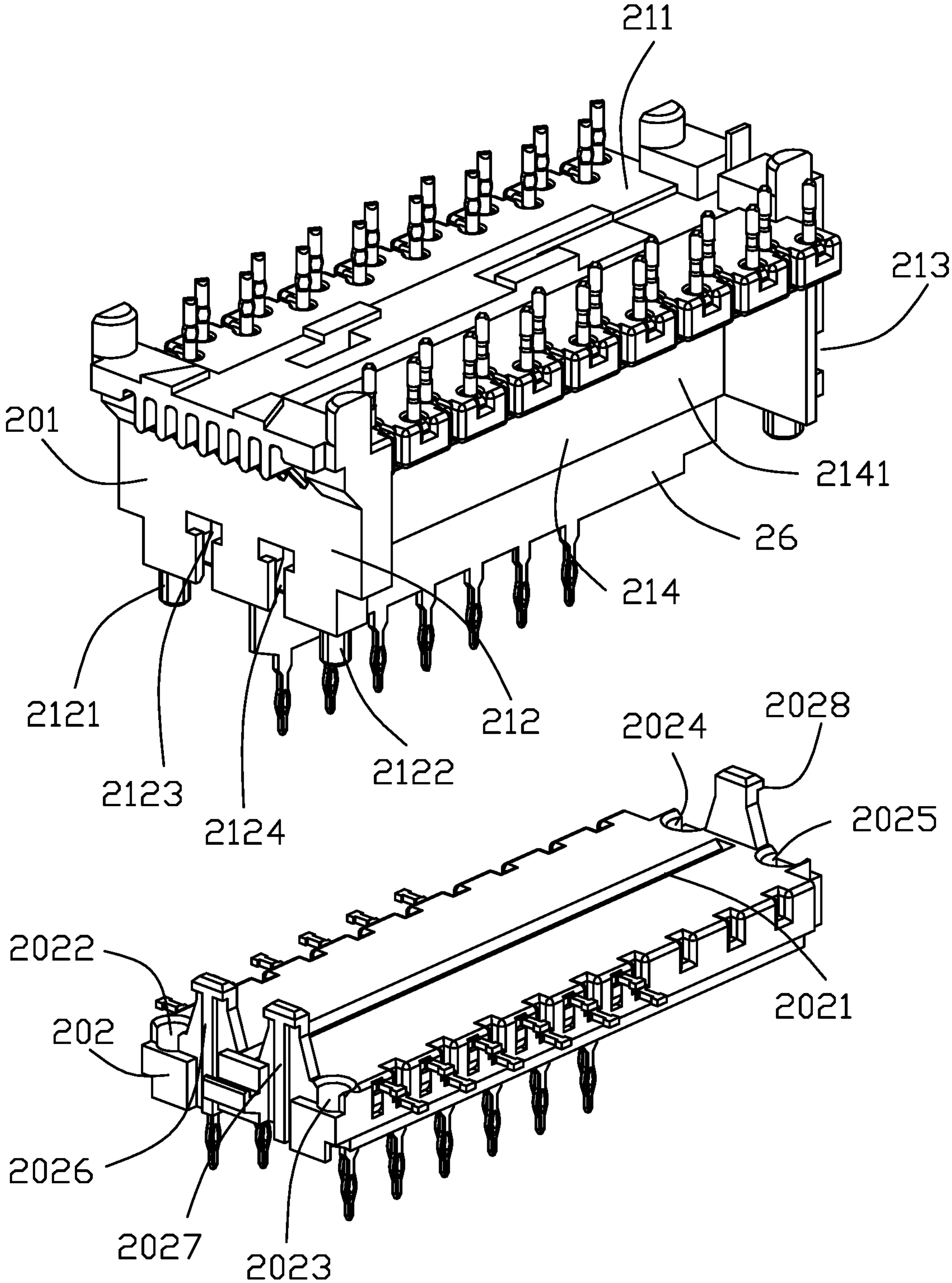
FIG. 10 is a further exploded view of the terminal module of the electrical connector in FIG. 9 with the circuit board removed.
Figure 11:
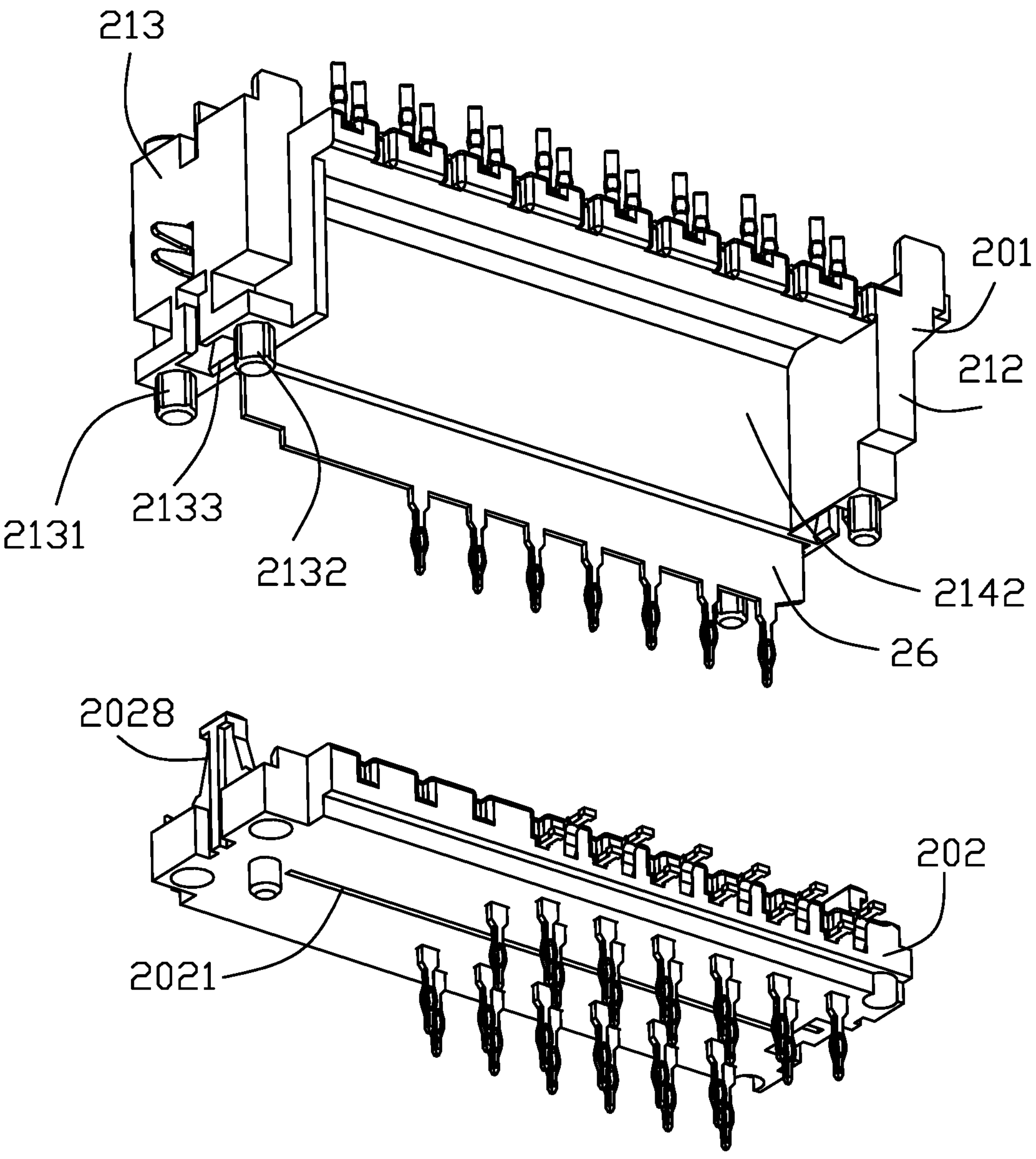
FIG. 11 is another perspective view of the terminal module of the electrical connector in FIG. 10.
Figure 12:
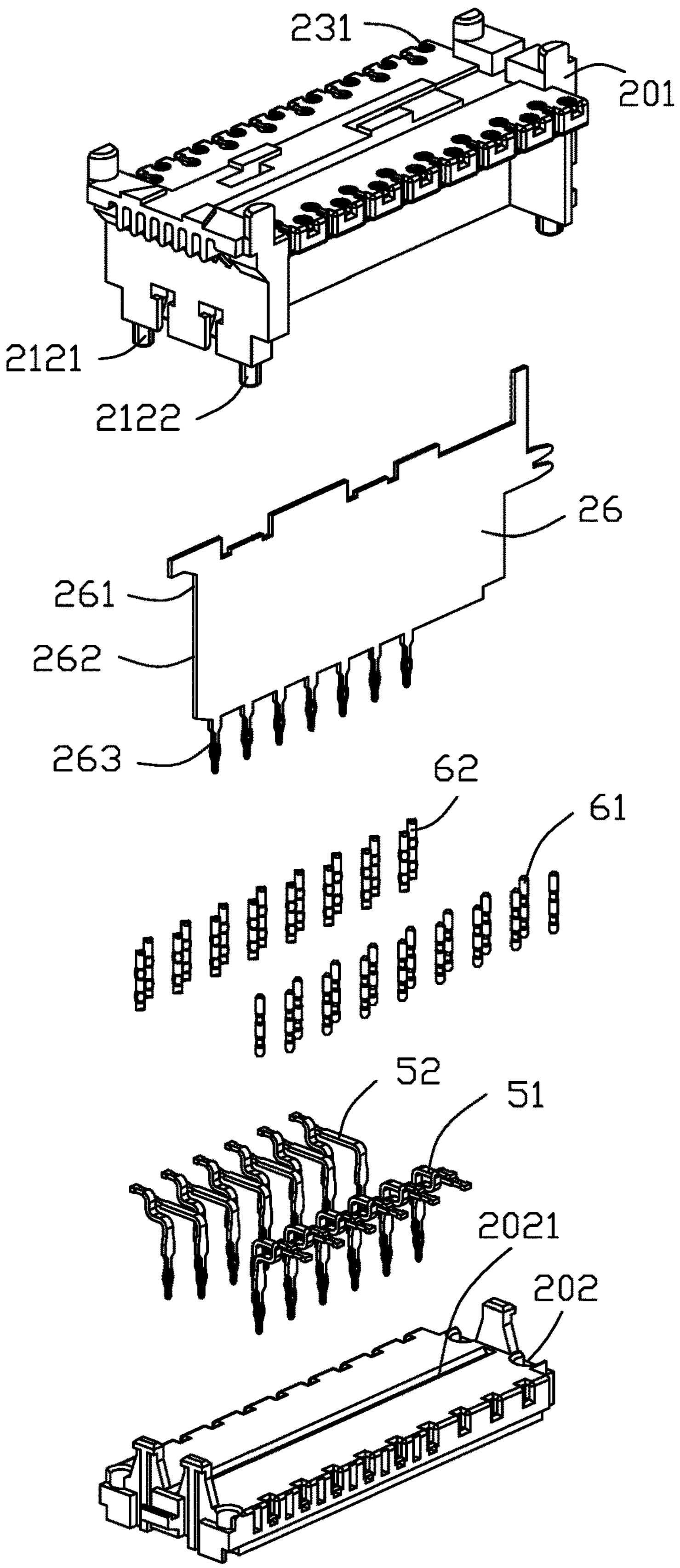
FIG. 12 is a further exploded view of the terminal module of the electrical connector in FIG. 10.
Figure 13:
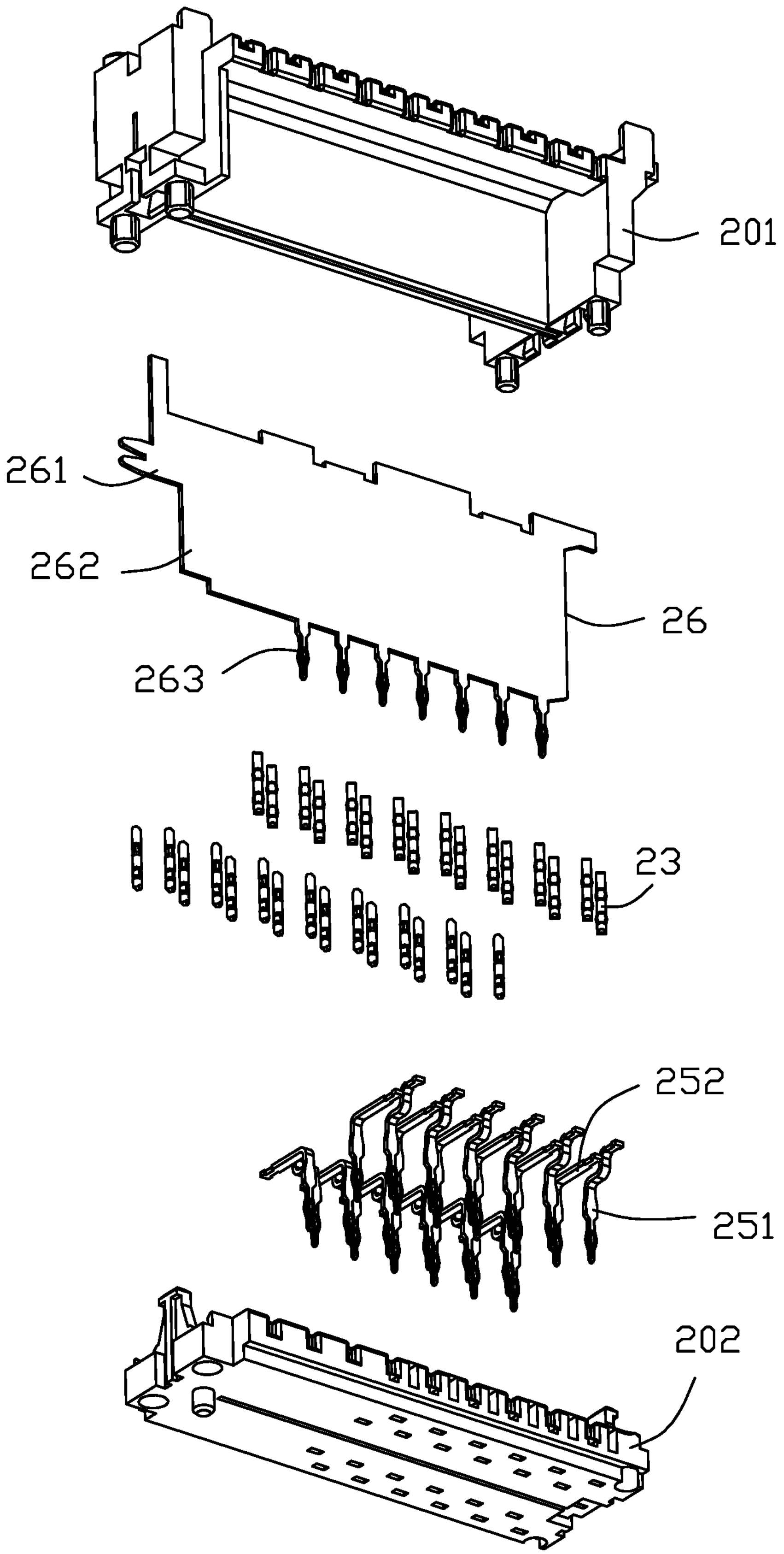
FIG. 13 is a further exploded view of the terminal module of the electrical connector in FIG. 11.
Figure 14:
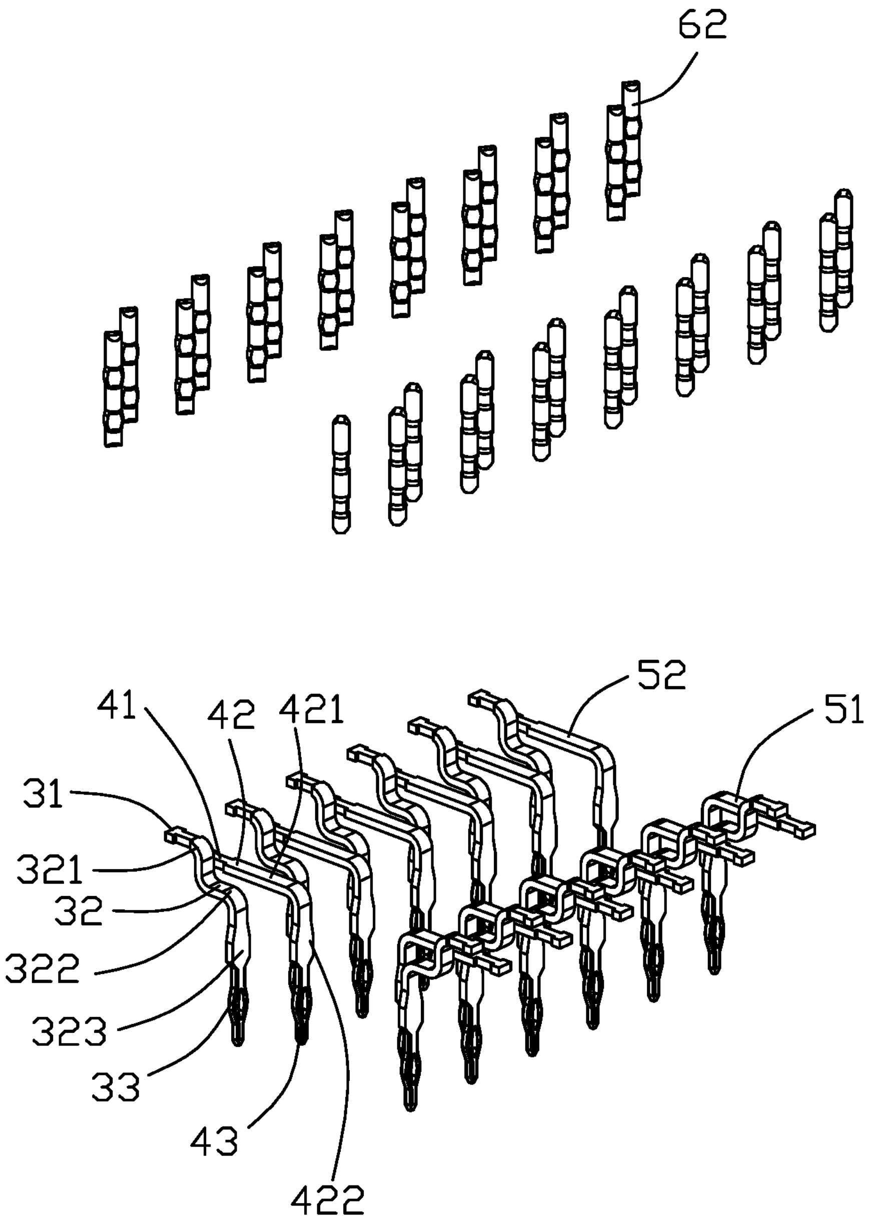
FIG. 14 is a further enlarged view of the intermediate terminal and the pin terminal of the electrical connector in FIG. 12.

Referring to FIGS. 1-14, an electrical connector 100 of the present invention is shown. The electrical connector 100 can be mated with a mating connector (not shown) and can be mounted to an external device. The electrical connector 100 comprises an insulating body 1, a terminal module 2 assembled in the insulating body 1, and a metal shielding shell 3 covering the outside of the insulating body 1. The electrical connector 100 is an RJ45 connector.

The terminal module 2 includes mating terminals 22 that are in contact with the mating connector, a circuit board 21 connected to the mating terminals, an insulating carrier 20 with an accommodating cavity, intermediate terminals 23 which are fixed on one side of the insulating carrier 20 and electrically connected to the mating terminals 22 through the circuit board 21, a magnetic module 24 accommodated in the accommodating cavity of the insulating carrier 20 and electrically connected to the intermediate terminals 23 and the pin terminals 25.

The circuit board 21 is arranged horizontally, wherein the mating terminals 22 are arranged in front of the circuit board 21, and the insulating carrier 20 is arranged below the circuit board 21. The insulating carrier 20 is a two-piece housing, including an upper housing 201 and a lower housing 202 opposite to the upper housing 201. The upper housing 201 includes a top wall 211, two side walls 212, 213 and a middle wall 214. The top wall 211 is substantially in the shape of a flat plate, the middle wall 214 is located below the top wall 211 and extends downward and perpendicular to the top wall 211. The top wall includes a plurality of intermediate terminal holes 231. Two first positioning posts 2121 and 2122 are protruded downward from the bottom of the side wall 212, and two second positioning posts 2131 and 2132 are protruded downward from the bottom of the side wall 213. The lower end of the side wall 212 is further provided with two first positioning holes 2123 and 2124, the first positioning holes 2123 and 2124 are recessed inward and penetrate through the bottom of the side wall 212. The lower end of the side wall 213 is provided with a second positioning hole 2133, the second positioning hole 2133 protrudes inward and penetrates the bottom of the side wall 213. The top wall 211, the two side walls 212 and 213 and the middle wall 214 respectively form a first concave portion 2141 and a second concave portion 2142 which are concave inwards on two side surfaces perpendicular to the mating direction. The lower housing 202 is substantially in the shape of a flat plate, and set the third positioning holes 2022 and 2023 at the positions corresponding to the first positioning posts 2121 and 2122, and set the fourth positioning holes 2024 and 2025 at the positions corresponding to the second positioning posts 2131 and 2132, set the third positioning posts 2026 and 2027 at the positions corresponding to the first positioning holes 2123 and 2124, and set the fourth positioning posts 2028 at the positions corresponding to the second positioning holes 2133. When the upper housing 201 and the lower housing 202 are assembled in the up-down direction, the first positioning posts 2121 and 2122 are received and fixed in the third positioning holes 2022 and 2023, and the second positioning posts 2131 and 2132 are received and fixed in the fourth positioning holes 2024 and 2025, the third positioning posts 2026 and 2027 are received and fixed in the first positioning holes 2123 and 2124, and the fourth positioning post 2028 is received and fixed in the second positioning hole 2133. The first concave portion 2141, the second concave portion 2142 and the lower housing 202 together form a first accommodating cavity 2143 and a second accommodating cavity 2144 which are disposed opposite to each other. The magnetic module 24 includes a first magnetic module 241 and a second magnetic module 242. The first magnetic module 241 is accommodated in the first accommodating cavity 2143, and the second magnetic module 242 is accommodated in the second accommodating cavity 2144.

The terminal module 2 further includes a metal shielding sheet 26, the upper housing 201 and the metal shielding sheet 26 are integrally formed. The metal shielding sheet 26 includes a first clamping portion 261 clamped to the intermediate wall 214, a second clamping portion 262 extending downward from the first clamping portion 261 beyond the bottom of the middle wall 214 and shielding ground pins 263 extending downward from the second clamping portion 262. The shielding ground pin 263 has a eye-of-the-needle structure and can be press-fitted to an external circuit board. The lower housing 202 also has a through slot 2021, the through slot 2021 extends downward through the lower housing 202. The size and shape of the through slot 2021 are formed to accommodate the metal shielding sheet 26, and the second clamping portion 262 of the metal shielding sheet 26 is clamped in the through slot. The shielding ground pins 263 are exposed at the bottom of the lower housing 202. The shielding sheet 26 can shield the transmission paths on both sides and avoid crosstalk between the two transmission paths.

The lower housing 202 is integrally formed with the pin terminals 25. The pin terminal 25 includes a plurality of first pin terminals 251 and a plurality of second pin terminals 252. Some of the first pin terminals 251 and second pin terminals 252 form a first group of pin terminals 51, others form a second group of pin terminals 52. The first group of pin terminals 51 are disposed on the side below the first magnetic module 241 and are electrically connected to one end of the first magnetic module 241. The second group of pin terminals 52 are disposed on the side below the second magnetic module 242 and are electrically connected to one end of the second magnetic module 242. The first pin terminal 251 includes a first contact portion 31 electrically connected to the magnetic module 24, a first mounting portion 33 for mounting to an external circuit board, and a middle portion 32 connecting the first contact portion 31 and the first mounting portion 33. The second pin terminal 252 includes a second contact portion 41 electrically connected to the magnetic module 24, a second mounting portion 43 for mounting to an external circuit board, and a middle portion 42 connecting the second contact portion 41 and the second mounting portion 43. The first mounting portion 33 and the second mounting portion 43 are eye-of-the-needle structures, the mounting part designed in this way does not need to be welded, and only needs to be pressed and mounted to the external circuit board, the crimping is reliable, the holding force is strong, and the signal transmission performance is good. The first middle portion 32 and the second middle portion 42 have different shapes. The first middle portion 32 includes a first vertical portion 321 extending downward and perpendicular to the first contact portion 31, a first horizontal portion 322 extending downward from the first vertical portion 321 and perpendicular to the first vertical portion 321 and a first extending portion 323 extending downward from the first horizontal portion 322 and perpendicular to the first horizontal portion 322. The second middle portion 42 includes a second horizontal portion 421 extending parallel to the rear from the second contact portion and a second vertical portion 422 extending downward from the second horizontal portion 421 and is perpendicular to the second horizontal portion 421. The different middle portion makes the first contact parts 31 of the first pin terminals 251 and the second contact parts 41 of the second pin terminals 251 arranged adjacently in the first group of pin terminals 51 and the second group of pin terminals 52 have different longitudinal heights. The first mounting portion 33 and the second mounting portion 43 are staggered into two rows, such a design increases the winding density of the enameled wires of the magnetic module 24 on the pin terminals 25.

Some intermediate terminals 23 form a first group of intermediate terminals 61 and others form a second group of intermediate terminals 62. The first group of intermediate terminals 61 are disposed on the side above the first magnetic module 241 and electrically connected to the other end of the first magnetic module 241. The second group of intermediate terminals 62 are disposed on the side above the second magnetic module 242 and electrically connected to the other end of the second magnetic module 242. The first group of intermediate terminals 61 and the second group of intermediate terminals 62 are respectively staggered and arranged in two rows, and are fixed in the corresponding terminal holes 231 of the top wall 211 of the upper housing 201. Such a design also increases the winding density of the enameled wire of the magnetic module 24 on the intermediate terminal 23.

It is worth noting that the arrangement of the two-piece housing is suitable for both the pin terminals of the eye-of-the-needle structure and the pin terminals of the ordinary through-hole mounting structure.

In the invention, the insulating carrier is formed by assembling the two-piece housing, thereby realizing the stable combination of the insulating carrier and the pin terminal of the eye-of-the-needle structure, and has stable quality, lower cost, low equipment investment, it can be achieved with just conventional moulds and dies.

The above describes only some of the embodiments of the present invention, but not all of the embodiments. Any equivalent changes to the technical solutions of the present invention by those skilled in the art by reading the description of the present invention are covered by the claims of the present invention.

What is claimed is:

1. An electrical connector for mounting on an external circuit board, comprising:

an insulating body;

a terminal module assembled on the insulating body and including a plurality of mating terminals, an insulating carrier with an accommodating cavity, a plurality of intermediate terminals fixed on one side of the insulating carrier and electrically connected to the mating terminals, a plurality of pin terminals fixed on the other side of the insulating carrier, and a magnetic module accommodated in the accommodating cavity and electrically connected to the intermediate terminals and the pin terminals, wherein the insulating carrier is a two-piece housing, the intermediate terminals are held in one housing piece, and the pin terminals are held in the other housing piece; and the two-piece housing comprises an upper housing and a lower housing assembled together to define the accommodating cavity, the intermediate terminals are mounted on the upper housing, and the pin terminals are integrally formed with the lower housing for mounting to an external circuit board.

2. The electrical connector as claimed in claim 1, wherein the pin terminal comprises a contact portion electrically connected with the magnetic module, a mounting portion, and a middle portion connecting the contact portion and the mounting portion, and the mounting portion has an eye-of-the-needle structure.

3. The electrical connector as claimed in claim 1, wherein the terminal module further comprises a circuit board, the intermediate terminals and the mating terminals are electrically connected through the circuit board.

4. The electrical connector as claimed in claim 3, wherein the circuit board is arranged horizontally, the mating terminals are arranged in front of the circuit board, and the insulating carrier is arranged below the circuit board.

5. The electrical connector as claimed in claim 4, wherein the upper housing comprises a substantially flat top wall and a downwardly extending middle wall located below the top wall, the lower housing is substantially in the shape of a flat plate, the upper housing and the lower housing are assembled along the up-down direction, and an accommodating cavity is formed on the two sides respectively, the magnetic module comprises a first magnetic module accommodated in an accommodating cavity on one side and a second magnetic module accommodated in an accommodating cavity on the opposite side thereof.

6. The electrical connector as claimed in claim 5, wherein the terminal module further comprises a metal shielding sheet formed on the middle wall, the lower housing comprises a through slot, and the metal shielding sheet extends downward through the through slot for connecting to an external circuit board.

7. The electrical connector as claimed in claim 6, wherein the pin terminal comprises a plurality of first pin terminals and a plurality of second pin terminals, some first pin terminals and second pin terminals form a first group which are arranged on one side of the first magnetic module and electrically connected to one end of the first magnetic module, the other first pin terminals and second pin terminals form a second group which are arranged on the other side of the second magnetic module and electrically connected to one end of the second magnetic module, the middle portions of the first pin terminals and the second pin terminals have different shapes, so that the contact portions of the first pin terminals and the second pin terminals arranged adjacently in the first group and the second group have different longitudinal heights, the mounting portions are staggered and arranged in two rows.

8. The electrical connector as claimed in claim 6, wherein some intermediate terminals form a first group which are arranged on the side of the first magnetic module and electrically connected with the other end of the first magnetic module, the other middle terminals form a second group which are arranged on the other side of the second magnetic module and electrically connected with the other end of the second magnetic module, the adjacent intermediate terminals in the first group and second group are staggered and arranged in two rows.

9. The electrical connector as claimed in claim 1, wherein the pin terminal is a through-hole mounting structure.

* * * * *